(12) United States Patent
Gordon

(10) Patent No.: US 6,296,004 B1
(45) Date of Patent: Oct. 2, 2001

(54) SUN SHIELD

(76) Inventor: Linda Carol Gordon, 4 Rainow Close, Middlewich, Cheshire CW10 0NU (GB)

( * ) Notice: Subject to any disclaimer, the term of this patent is extended or adjusted under 35 U.S.C. 154(b) by 0 days.

(21) Appl. No.: 09/381,813

(22) PCT Filed: Mar. 26, 1998

(86) PCT No.: PCT/GB98/00738

§ 371 Date: Sep. 24, 1999

§ 102(e) Date: Sep. 24, 1999

(87) PCT Pub. No.: WO98/42228

PCT Pub. Date: Oct. 1, 1998

(30) Foreign Application Priority Data

Mar. 26, 1997 (GB) .................................................. 9706312

(51) Int. Cl.$^7$ .................................................. A45B 25/18
(52) U.S. Cl. .............................. 135/132; 135/115; 47/17; 47/31; 523/135
(58) Field of Search ..................... 135/115, 132; 428/208, 209, 329, 457, 458, 483; 47/31, 26, 17; 523/135

(56) References Cited

U.S. PATENT DOCUMENTS

| | | | |
|---|---|---|---|
| 3,290,203 | * | 12/1966 | Antonson et al. . |
| 3,857,804 | * | 12/1974 | Glatti et al. . |
| 3,911,620 | * | 10/1975 | Glatti . |
| 4,175,417 | * | 11/1979 | Vergnani et al. . |
| 4,358,488 | * | 11/1982 | Dunklin et al. . |
| 4,423,164 | * | 12/1983 | Bar . |
| 4,761,913 | * | 8/1988 | Henningsson ............................ 47/17 |
| 4,895,904 | * | 1/1990 | Allingham . |
| 5,022,181 | * | 6/1991 | Longstaff . |
| 5,306,548 | * | 4/1994 | Zabrocki et al. . |
| 5,542,732 | * | 8/1996 | Pollman . |
| 5,771,630 | * | 6/1998 | Harasawa et al. . |
| 6,005,044 | * | 12/1999 | Karl et al. . |

FOREIGN PATENT DOCUMENTS

| | | | |
|---|---|---|---|
| 196 23 965 | * | 11/1997 | (DE) . |
| 295 13 603 | * | 11/1997 | (DE) . |
| 0 267 655 | * | 5/1988 | (EP) . |
| 2 104 446 | * | 3/1983 | (GB) . |

OTHER PUBLICATIONS

XP–002072151 Derwent Abstract, Oct., 1989.*

* cited by examiner

Primary Examiner—Robert Canfield
(74) Attorney, Agent, or Firm—Samuels, Gauthier & Stevens

(57) ABSTRACT

A sun shield capable of protecting persons or plants against the harmful effects of incident radiation and being formed from a substantially transparent flexible material (13) which at least substantially absorbs and/or reflects incident radiation in the ultraviolet and infrared frequency ranges and which may be repeatedly folded without becoming damaged. The supple, flexible and durable transparent material (13) may be mounted on a framework (14) to be attached to, for example, a child's car seat (11) or pushchair (26) or to serve as a parasol or canopy, or to protect plants from excessive ultraviolet or infrared radiation.

16 Claims, 2 Drawing Sheets

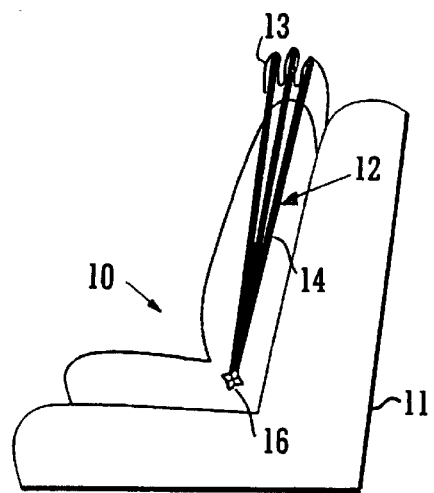
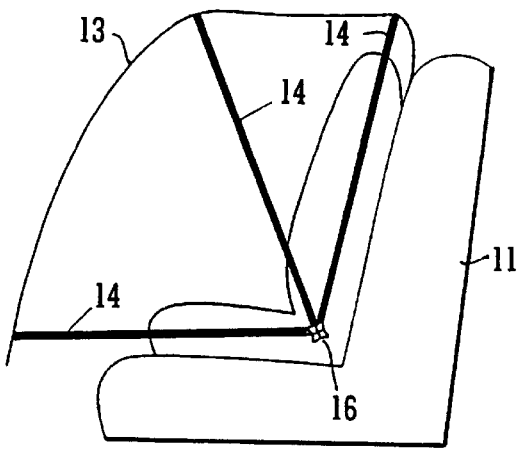
FIG. 1a
FIG. 1b
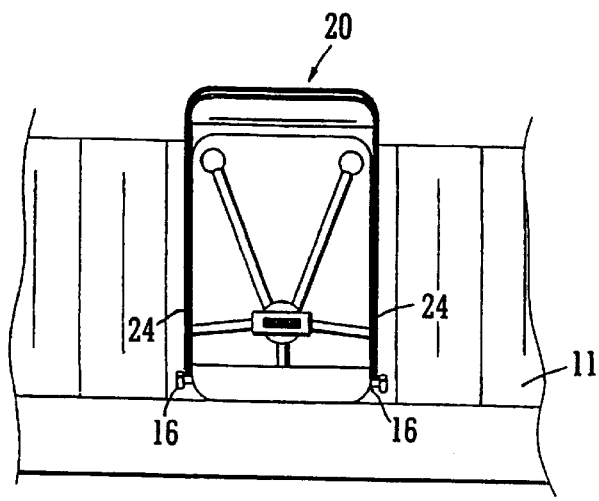
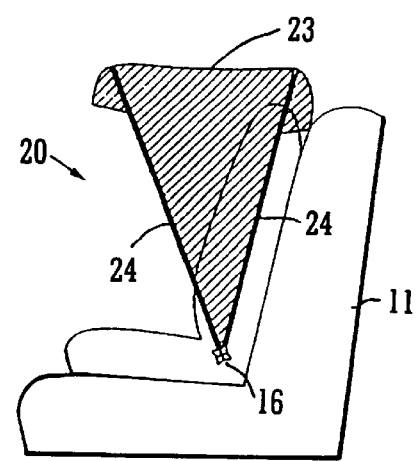
FIG. 2a
FIG. 2b

SUN SHIELD

THIS INVENTION relates to a sun shield, particularly, though not exclusively, for children, and animals.

It is known that exposure to the sun can cause a child or animal to be exposed to ultraviolet radiation in the range of 290 to 320 nM (UV-B) and 320–400 nM (UV-A), which can be harmful to the skin. UV-A is known to cause degeneration of elastic and collagen fibres in the dermis of the skin and UV-B is known to cause skin cancer, premature aging and burning of the skin. Young children are particularly susceptible to the effects of ultraviolet radiation. Furthermore, incident IR (infrared) radiation (above 700 nM) can cause the child to become uncomfortably warm which in turn can cause the child to become unwell.

It is an object of the present invention to minimise the effects of the incident radiation on a child by providing an effective sun shield.

GB 2280678 describes a sun shield in the form of a plastics film mounted on a framework to provide a shelter against the harmful effects of ultraviolet radiation. The plastics film is stated to be flexible thus to be formed around a curved framework and to include, as part of its composition, a UV-absorbing material, the extent of absorption being selectable according to the intended use. Such a sun shield cannot additionally provide protection against the harmful effects of IR radiation, and the composition of the film is to be established closely within pre-determined requirements thus rendering it expensive in manufacture.

According to the present invention therefore there is provided a sun shield capable of protecting against the harmful effects of incident radiation, formed from a material which is at least substantially transparent, which is sufficiently flexible and supple as to be readily folded and/or creased without becoming split or permanently marked, the material consisting of at least two superimposed layers of different materials and providing at least substantially complete absorption of UV radiation in the range of 290 to 400 nM and at least substantially complete reflection of IR radiation above 700 nM.

Further according to the invention there is provided a sun shield in which the material is in the form of a transparent flexible plastics film laminated or otherwise superimposed with a further transparent film which further film includes a material which at least substantially absorbs incident radiation in the range of 290 to 400 nM.

Still further according to the present invention there is provided a sun shield in which the material is in the form of a flexible plastics film onto the surface of which there is deposited a coating which at least substantially absorbs and/or reflects incident radiation in the range of 290 to 400 nM and above 700 nM.

Still further according to the invention there is provided a sun shield wherein the at least substantially transparent flexible material is attached to and supported upon a framework of rigid members which are adapted for attachment to a child's car seat or the like or a wheeled carriage such as a pushchair, the frame members being relatively pivotable thus to fold the sun shield into a stowed condition when not required.

When referring herein to a "flexible" material this term is to be construed as one which can be readily folded and/or creased substantially without becoming split or permanently marked. Such materials may be used for hoods and side screens which are frequently folded and unfolded and thus must be sufficiently supple to withstand such treatment without damage.

Thus it is possible to provide effective shielding from the harmful effects of the sun's rays, whilst allowing visibility through the shield, whereby a child retains the ability to respond to visual stimuli, while visibility of the child through the shield is also maintained, i.e. the child can be readily seen by the parent or guardian.

The shield may be rendered permeable to air, for example by perforations, whereby air circulation within the shield is encouraged.

The invention will be described further by way of example only and with reference to the accompanying drawings of which:

FIGS. 1a and 1b show schematic side views of a first embodiment of a sun shield according to the present invention releasably attached to a car safety seat, in retracted and deployed positions, respectively;

FIGS. 2a and 2b show respectively front and side views of a second embodiment according to the present invention;

Figure 4:
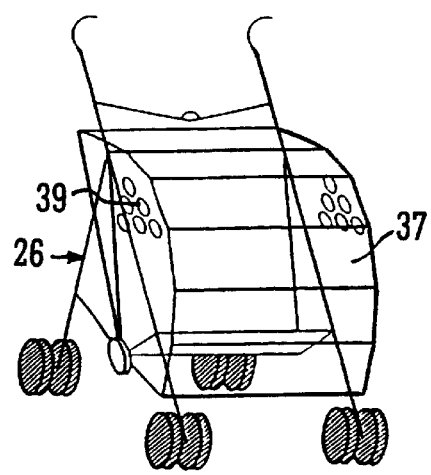

and FIG. 4 is a perspective view of a sun shield mounted on a push-chair and shown in the closed i.e. deployed position.

Referring now to the drawings, there is shown in FIGS. 1a and 1b a child's car safety seat 10 of conventional form secured to a car seat 11. The securing of the child's seat 10 to the car seat 11 can be achieved in any suitable manner such as, for example, by use of the car seat belts (not shown). A sun shield according to the invention in the form of a hood 12 is releasably attached to the child's seat 10 by way of clamps (not shown) which secure the hood 12 to each side of the safety sear 10.

The hood 12 comprises a highly flexible and supple transparent plastics material 13 which is secured to three frame members 14, which can pivot relative to each other about a pivot hinge 16. In this example, the hood 12 is formed from a composite plastics sheet material, e.g. polyvinyl chloride (PVC) to which is laminated or otherwise superimposed a further sheet of material e.g. polyester which includes a dispersed material which absorbs a substantial part of incident UV-A, UV-B radiation and which reflects IR radiation, to an extent whereby harmful parts of the incident radiation can be prevented from reaching a child sitting in the seat and the child is prevented from becoming uncomfortably warm. Alternatively, an absorbent and/or reflective substance can be coated onto the hood material.

A metallic material, for example in the form of a metal oxide, may be used to provide the IR reflection, and absorption of the UV radiation may be achieved using a suitably treated plastics material. In one embodiment, a metal and/or metallic oxide is coated onto a polyester plastics carrier and the carrier is laminated to the hood material.

The radiation absorbing and/or reflecting material has a UV absorbance which is preferably greater than 2.0 across a wavelength range of 293–320 nM and preferably greater than 0.5 across a wavelength range 320–390 nM. The material also reflects a substantial part of incident IR radiation above 700 nM.

The frame members 14 comprise generally lightweight flexible members, for example plastics, aluminium or steel tubing, in a preferred embodiment of the invention. However they can be formed from any other suitable material, as desired or as appropriate.

The clamps (not shown) can co-operate with clamp attachments (not shown) on the seat 10 or may co-operate directly with the seat 10 to secure the hood to the seat 10.

In use, when incident radiation entering the car, e.g. the sun's rays, is not strong enough to cause difficulty for a child in the safety seat, the hood 12 can be retracted as shown in FIG. 1a. To achieve this position the frame members 14 are pivoted about pivot hinge 16 and, as the transparent hood material 13 is flexible, it folds to allow the frame members 14 to reach the stowed position shown in the figure. When the incident radiation becomes too strong for a child the frame members 14 may be pivoted about the pivot hinge 16 to deploy or extend the hood material 13 such that it adopts the position shown in FIG. 1b. With the hood 12 in this position, the child is shielded from harmful radiation. Between its fully open and fully closed positions, the user may control the level of protection afforded by the hood.

The material 13 acts to absorb a substantial part of incident UV-A and UV-B radiation and reflects a substantial part of IR radiation. In particular, the treated polyester carrier layer acts to absorb a substantial part of incident UV-A and UV-B and the metal and/or metal oxide coating acts to reflect a substantial part of incident IR radiation. Whilst the hood is in the position shown in FIG. 1b, it will be appreciated that, as the material is transparent, the child is able to see out of the car window, and can therefore respond to stimuli which can be seen from the window. Also, the child is not hidden from view and can be readily seen by the parent or guardian.

Referring now to FIGS. 2a and 2b, there is shown an alternative embodiment of child safety seat 20 in accordance with the present invention. The only different between this embodiment and that shown in FIGS. 1a and 1b is that the hood material 23 is supported on only two pivotal frame members 24, and does not extend as far around the child as in the embodiment of FIGS. 1a and 1b. However, the hood 22 of the second embodiment is still capable of protecting the child from the harmful effects of the radiation, e.g. the sun's rays.

Whilst the specific embodiments described are for use with a child's car safety seat, the sun shield of the present invention can also be used with baby carriages of any description, for example prams, carrycots, pushchairs and buggies, wheelchairs or any other similar or suitable vehicle or carriage.

Figure 3A:
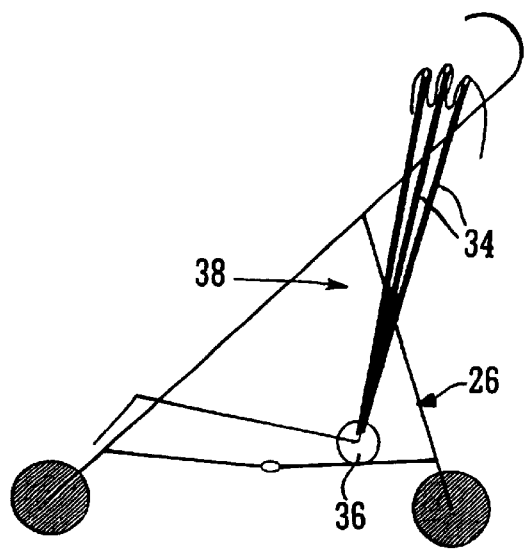
FIGS. 3a and 3b show schematic side views of a third embodiment of a sun shield according to the present invention removably attached to a push-chair and shown in retracted and deployed positions, respectively.
Figure 3B:
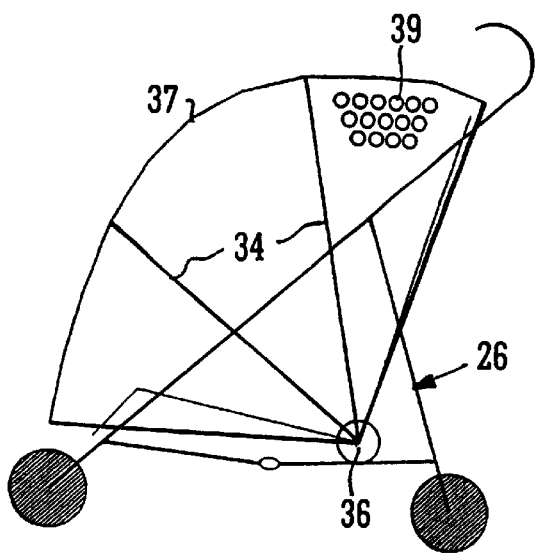

For example, as illustrated in FIGS. 3a, 3b and 4a pushchair schematically illustrated at 26 may include a hood similar to that illustrated in FIGS. 1a and 1b and consisting of frame members 34 pivotally mounted at 36 on the frame of the pushchair and supporting hood material 37 which again is of a flexible nature whereby the assembly may be retracted as illustrated at 38 in FIG. 3a. If required, the hood material may include an array of ventilation apertures 39 in addition to or instead of the material itself being of an air permeable nature. This applies also to the hood material of previously described embodiments.

The material having UV/IR absorption/reflection, may be provided in laminated or otherwise superimposed panels, not necessarily occupying the entire surface of the hood, but covering those areas through which sunlight will be most intrusive. Furthermore, one or more separate panels of such material may be removably attached as an overlay to, for example, a conventional rain hood or the like, externally or internally, to afford the required protection. In this example the protective shield may be removably or permanently attachable to parts of a child's vehicle seat or pushchair.

Furthermore the present invention may not be embodied in the form of a hood and may be incorporated in a parasol or umbrella or garden furniture.

The material from which the sun shield is produced, in one example, is a highly flexible PVC having a thickness in the region of 180–250 uM. Particularly for nursery products, PVC is preferred since it has a supple, rather warm feel against the skin. It is also highly flexible and will sustain much creasing without becoming permanently marked or split. Where the radiation absorbing/reflecting material is laminated to the PVC sheet, the protecting material may be polyester which either incorporates, or includes a coating of, the absorbing/reflecting material. Such materials are known and may be chosen according to their optical properties and physical durability, particularly such that UV and IR radiation is substantially, if not completely, absorbed and/or reflected.

In an alternative arrangement the PVC base material itself may be coated by a sputtered thin film applied to one or both surfaces. This process ensures the establishment of a coating of precisely controlled thickness and optical properties. In a still further alternative the protecting material may be provided by a surface chemical treatment of the PVC base material. An advantage of simply laminating a readily available protective polyester film onto base PVC is that both laminae are readily available, particularly the PVC film which is commonly used for rainhoods, is economically advantageous and offers a good combination of flexibility, clarity, tear resistance, and ease of handling, cutting and sewing. Additionally, such PVC materials may be readily self-coloured or printed with a pattern, the printing being sandwiched between the laminae if required in order that it shall be protected against abrasion. A particular polyester film which may be laminated onto PVC to produce a sun shield in accordance with one example of this invention is available under the registered Trade Mark VIEWLUX 70 and is available from Madico Inc. of Woburn, Mass., U.S.A. VIEWLUX 70 is a sputtered polyester film exhibiting both substantial light transmission and substantial absorption/reflection of incident radiation.

It is of course to be understood that the invention is not intended to be restricted to the details of the above embodiments which are described by way of example only.

Thus, for example, it would be advantageous for the hood material to be rainproof and it can be formed from a material of any colour.

There are many additional applications which may incorporate a sun shield made in accordance with this invention. For example, it may be used in horticulture for greenhouses or, on a smaller scale for cloches where plant life, particularly in the early stages of growth, should be protected from excessive ultra violet and/or infra red radiation.

What is claimed is:

1. A sun shield capable of protecting against the harmful effects of incident radiation, formed from a material which is at least substantially transparent, which is sufficiently flexible and supple as to be readily folded and creased without becoming split or permanently marked or causing visibility to be impaired, the material consisting of at least two superimposed layers of different materials and providing at least substantially complete absorption of UV radiation in the range of 290 to 400 nM and at least substantially complete reflection of IR radiation above 700 nM, while remaining at least substantially transparent.

2. A sun shield according to claim 1, in which the material is in the form of a transparent flexible plastics film superimposed with a further transparent film which further film includes a material which at least substantially absorbs incident radiation in the range of 290 to 400 nM.

3. A sun shield according to claim 2, wherein said transparent flexible plastics film is polyvinylchloride and said further transparent film is polyester.

4. A sun shield according to claim 3, wherein incident radiation is absorbed or reflected by a substance dispersed within the polyester film.

5. A sun shield according to claim 3, wherein reflection of radiation above 700 nM is afforded by a metal oxide based coating on the polyester film.

6. A sun shield according to claim 1, in which the material is in the form of a flexible plastics film onto the surface of which there is deposited a coating which at least substantially absorbs incident radiation in the range of 290 to 400 nM and reflects incident radiation above 700 nM.

7. A sun shield according to claim 1, wherein the radiation absorbing/reflecting material has a UV absorbance which is greater than 2.0 across a wavelength of 293 to 320 nM and greater than 5.0 across a wavelength range of 320 to 390 nM.

8. A sun shield according to claim 2, wherein the transparent flexible plastics film has a thickness in the region of 180 to 250 $\mu$m.

9. A sun shield according to claim 2, including printed matter, located between the films.

10. A sun shield according to claim 6, wherein the coating is deposited on the surface of the flexible plastics film by sputtering.

11. A sun shield according to claim 1, wherein the transparent flexible material is perforated for ventilation.

12. A sun shield according to any preceding claim, wherein the at least substantially transparent flexible material is attached to and supported upon a framework of rigid members which are adapted for attachment to a child's car seat or wheeled carriage the frame members being relatively pivotable thus to fold the sun shield into a stowed condition when not required.

13. A sun shield according to claim 12, comprising a hood attached or adapted to be attached to a child's car seat or a wheeled carriage the material providing the UV/IR absorption/reflection being provided in at least one panel occupying less than the entire surface of the hood.

14. A sun shield according to claim 13, wherein said at least one panel is removably or permanently attachable to the hood and to said framework.

15. A sun shield according to any one of claims 1 to 11, mounted on a framework incorporated within a parasol or on garden furniture.

16. A sun shield according to any one of claims 1 to 11, mounted on a framework for horticulture use in the protection of plants.

* * * * *